(12) United States Patent (10) Patent No.: US 8,094,973 B2
Bernal et al. (45) Date of Patent: Jan. 10, 2012

(54) CONTENT AWARE IMAGE RESIZING FOR TEXT AND CONTONE IMAGES

(75) Inventors: Edgar Bernal, Webster, NY (US); Robert P Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 765 days.

(21) Appl. No.: 12/246,083

(22) Filed: Oct. 6, 2008

(65) Prior Publication Data

US 2010/0086207 A1 Apr. 8, 2010

(51) Int. Cl.
*G06K 9/32* (2006.01)
(52) U.S. Cl. ...................................... 382/298
(58) Field of Classification Search .................... 382/298
See application file for complete search history.

(56) References Cited

U.S. PATENT DOCUMENTS

| 7,477,800 B2 * | 1/2009 | Avidan et al. | 382/298 |
| 2009/0185210 A1 * | 7/2009 | Safonov et al. | 358/1.11 |
| 2010/0201711 A1 * | 8/2010 | Fillion et al. | 345/660 |

OTHER PUBLICATIONS

"Seam Carving for Content-Aware Image Resizing," S. Avidan, A. Shamir, ACM Transactions on Graphics, vol. 26, No. 3, SIGGRAPH 2007.

* cited by examiner

*Primary Examiner* — Matthew Bella
*Assistant Examiner* — Dennis Rosario
(74) *Attorney, Agent, or Firm* — Fay Sharpe LLP (57) ABSTRACT

A method, computer readable medium, and computing device for resizing images. A digital image arranged in a rectangular array of pixels is received for resizing in either a horizontal direction or a vertical direction. An energy value is computed for each of the pixels, and pixels are connected to form extended 8-connectivity seams, with each seam having a cumulative energy value. The digital image is segmented into segments corresponding to lines of text and/or images. A seam is selected to best maintain proportionality of white space in the segments when the seam is either replicated or deleted. The selected seam then replicated or deleted. At least the seam selection and replication or deletion is repeated until the resized image is the desired size. The resized image is then outputted to a display screen, storage device, and/or printer.

23 Claims, 10 Drawing Sheets

The ship drew on and had safely passed the strait, which some volcanic shock has made between the Calasareigne and Jaros islands; had doubled Pomegue, and approached the harbor under topsails, jib, and spanker, but so slowly and sedately that the idlers, with that instinct which is the forerunner of evil, asked one another what misfortune could have happened on board. However, those experienced in navigation saw plainly that if any accident had occurred, it was not to the vessel herself, for she bore down with all the evidence of being skilfully handled, the anchor a-cockbill, the jib boom guys already eased off, and standing by the side of the pilot, who was steering the Pharaon towards the narrow entrance of the inner port, was a young man, who, with activity and vigilant eye, watched every motion of the ship, and repeated each direction of the pilot.

The vague disquietude which prevailed among the spectators had so much affected one of the crowd that he did not await the arrival of the vessel in harbor, but jumping into a small skiff, desired to be pulled alongside the Pharaon, which he reached as she rounded into La Reserve basin.

ORIGINAL IMAGE (960x720 PIXELS)

The ship drew on and had safely passed the strait, which some volcanic shock has made between the Calasareigne and Jaros islands; had doubled Pomegue, and approached the harbor under topsails, jib, and spanker, but so slowly and sedately that the idlers, with that instinct which is the forerunner of evil, asked one another what misfortune could have happened on board. However, those experienced in navigation saw plainly that if any accident had occurred, it was not to the vessel herself, for she bore down with all the evidence of being skilfully handled, the anchor a-cockbill, the jib boom guys already eased off, and standing by the side of the pilot, who was steering the Pharaon towards the narrow entrance of the inner port, was a young man, who, with activity and vigilant eye, watched every motion of the ship, and repeated each direction of the pilot.
The vague disquietude which prevailed among the spectators had so much affected one of the crowd that he did not await the arrival of the vessel in harbor, but jumping into a small skiff, desired to be pulled alongside the Pharaon, which he reached as she rounded into La Reserve basin.

AFTER REDUCTION OF ORIGINAL WIDTH BY 100 PIXELS

The ship drew on and had safely passed the strait, which some volcanic shock has made between the Calasareigne and Jaros islands; had doubled Pomegue, and approached the harbor under topsails, jib, and spanker, but so slowly and sedately that the idlers, with that instinct which is the forerunner of evil, asked one another what misfortune could have happened on board. However, those experienced in navigation saw plainly that if any accident had occurred, it was not to the vessel herself, for she bore down with all the evidence of being skilfully handled, the anchor a-cockbill, the jib boom guys already eased off, and standing by the side of the pilot, who was steering the Pharaon towards the narrow entrance of the inner port, was a young man, who, with activity and vigilant eye, watched every motion of the ship, and repeated each direction of the pilot.
The vague disquietude which prevailed among the spectators had so much affected one of the crowd that he did not await the arrival of the vessel in harbor, but jumping into a small skiff, desired to be pulled alongside the Pharaon, which he reached as she rounded into La Reserve basin.

AFTER REDUCTION OF ORIGINAL WIDTH BY 100 PIXELS

CONTENT AWARE IMAGE RESIZING FOR TEXT AND CONTONE IMAGES

Attention is directed to the following co-pending applications, the disclosures of which are incorporated herein in their entirety by reference: U.S. application Ser. No. 12/242,036, filed Sep. 30, 2008, now U.S. Pat. No. 8,023,153 B2, entitled "Content-Aware Halftone Image Resizing"; U.S. application Ser. No. 12/242,119, filed Sep. 30, 2008, entitled "Content-Aware Halftone Image Resizing using Iterative Determination of Energy Metrics"; U.S. application Ser. No. 12/242,183, filed Sep. 30, 2008, entitled "Content-Aware Uniform Rosette Color Halftone Image Resizing"; and U.S. application Ser. No. 12/242,222, filed Sep. 30, 2008, entitled "Content-Aware Uniform Rosette Color Halftone Image Resizing using Iterative Determination of Energy Metrics". The appropriate components and processes of the above co-pending applications may be selected for the teaching and support of the present application in embodiments thereof.

BACKGROUND

Document editability, portability, and dynamic layout can be difficult to accomplish when utilizing simple solutions for image resizing, considering the increasing complexity of digital media handling. Consider, for example, that a document can be rasterized and halftoned for a particular binary print path. That document may be directed to a different printer, possibly years later when extracted from an archive, with different paper size capabilities. This may require image editing, cropping and resizing of image content prior to printing on a given print engine. Also, images may generally be re-purposed to print on different paper sizes and require layout modifications and resizing. For instance, techniques have been proposed to automatically rearrange/reformat the content of a document in response to input from a user to accommodate different paper sizes and formats.

Figure 1:
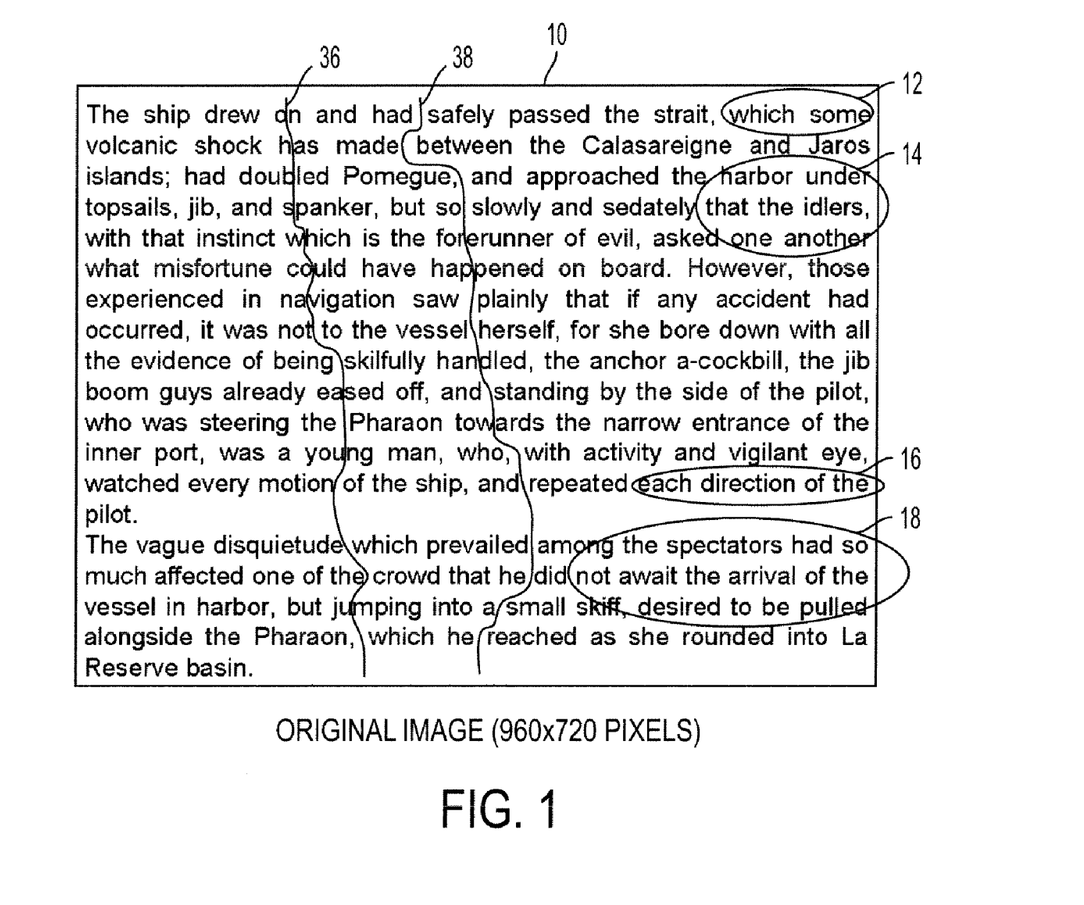
FIG. 1 is a representation of an exemplary 8-connectivity seam and an exemplary extended 8-connectivity seam.
Figure 2:
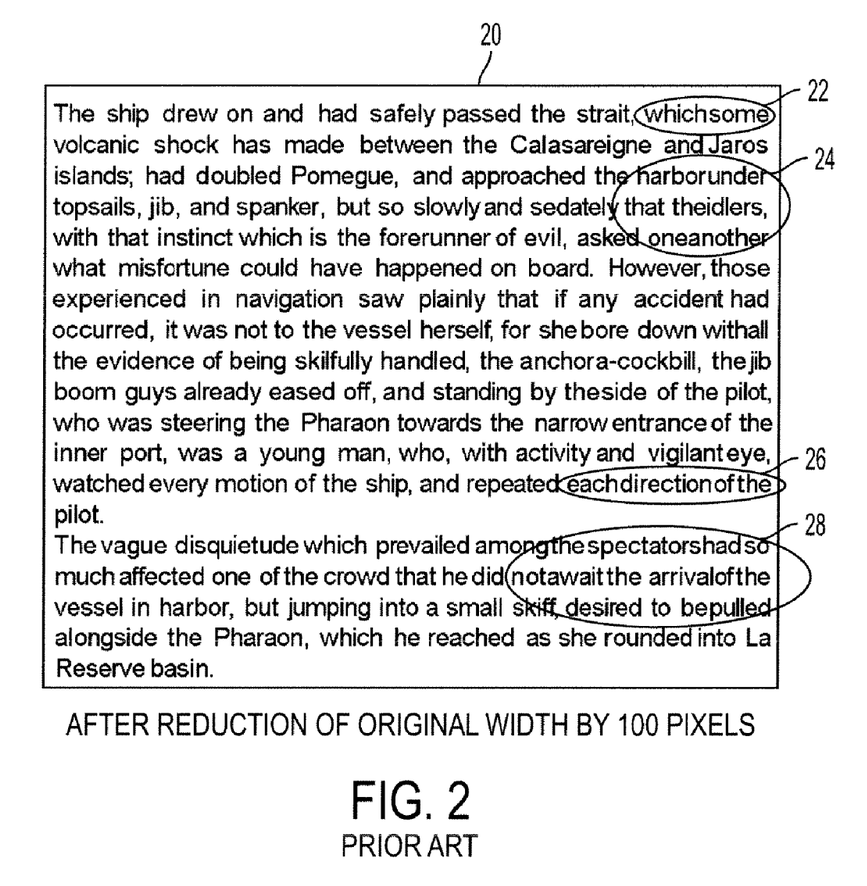
FIG. 2 is a reduced-width image resulting from application of a prior art seam carving method.

With regard to resizing, Avidan and Shamir ("*Seam Carving for Content-Aware Image Resizing*," S. Avidan, A. Shamir, ACM Transactions on Graphics, Volume 26, Number 3, SIGGRAPH 2007), incorporated herein in its entirety by reference, have shown that preferred resizing can be achieved by considering the image content in addition to pure geometric constraints, but their technique is designed for continuous-tone images and does not perform well on synthetic or text-based images. For example, with reference to FIG. 1, a text-based original image 10 is shown, having a height of 720 pixels and a width of 960 pixels as shown. Text areas of particular interest are identified by circled areas 12-18. With reference now to FIG. 2, and continuing reference to FIG. 1, a reduced-width image 20 is shown, resulting from application of the Avidan and Shamir method to the image of FIG. 1 to reduce its width by 100 pixels. Text areas corresponding to the circled areas of FIG. 1 are identified by circled areas 22-28. Notice that the word spacing within the corresponding lines is no longer uniform, and in particular, words in the circled areas 22-28 appear to be joined together, making the writing difficult to interpret. For example, the circled area 12 contains the phrase "which some" which, after application of the Avidan and Shamir method for width reduction, appears to contain a single word "whichsome" in the corresponding circled area 22.

As shown by example presented above, there exists a need for an improved image resizing method. In particular, there exists a need for an improved image resizing method which maintains the relative spacing of characters and words in a text-based image. And, more particularly, there exists a need for an improved image resizing method which maintains the relative spacing of characters and words in a text-based image while still working well for natural contone images, e.g., digital photographs.

BRIEF DESCRIPTION

A method for resizing images is provided. The method includes receiving a digital image arranged in a rectangular array of rows and columns of pixels. The received digital image is to be resized in either a horizontal direction or a vertical direction. An energy value is computed for each of the pixels. Pixels are selected to form extended 8-connectivity seams, with each seam having a cumulative energy being the sum of the energy values of the selected pixels forming the seam. The digital image is segmented into segments corresponding to lines of text and/or images. An extended 8-connectivity seam is selected based on best maintaining a proportionality of white space in the segments when the seam is either replicated or deleted. The selected seam is then replicated if the digital image is being enlarged in size or deleted if the digital image is being reduced in size. At least the seam selection and replication or deletion is repeated until the resized image is the desired size. The resized image is then outputted to a display screen, storage device, and/or printer.

Also provided is a computer readable medium storing a program for causing a computer to execute a process for resizing images. The process includes receiving a digital image arranged in a rectangular array of rows and columns of pixels. The received digital image is to be resized in either a horizontal direction or a vertical direction. An energy value is computed for each of the pixels. Pixels are selected to form extended 8-connectivity seams, with each seam having a cumulative energy being the sum of the energy values of the selected pixels forming the seam. The digital image is segmented into segments corresponding to lines of text and/or images. An extended 8-connectivity seam is selected based on best maintaining a proportionality of white space in the segments when the seam is either replicated or deleted. The selected seam is then replicated if the digital image is being enlarged in size or deleted if the digital image is being reduced in size. At least the seam selection and replication or deletion is repeated until the resized image is the desired size. The resized image is then outputted to a display screen, storage device, and/or printer.

Further provided is a computing device for resizing images. The computing device includes a system memory for storing program applications and/or an image editing module, and a processor for controlling operation of the stored program applications. The system may also include storage for accessing the program applications and/or the image editing module for storing in the system memory, and a communication interface for accessing the program applications and the image editing module, wherein the image editing module, when stored in the memory, is configured to perform an image resizing process. The process includes receiving a digital image arranged in a rectangular array of rows and columns of pixels. The received digital image is to be resized in either a horizontal direction or a vertical direction. An energy value is computed for each of the pixels. Pixels are selected to form extended 8-connectivity seams, with each seam having a cumulative energy being the sum of the energy values of the selected pixels forming the seam. The digital image is segmented into segments corresponding to lines of text and/or images. An extended 8-connectivity seam is selected based on best maintaining a proportionality of white space in the segments when the seam is either replicated or deleted. The selected seam is then replicated if the digital image is being enlarged in size or deleted if the digital image is being reduced in size. At least the seam selection and replication or deletion is repeated until the resized image is the desired size. The resized image is then outputted to a display screen, storage device, and/or printer.

DETAILED DESCRIPTION

Disclosed herein are a system and method for image resizing of text and contone images.

Figure 3:
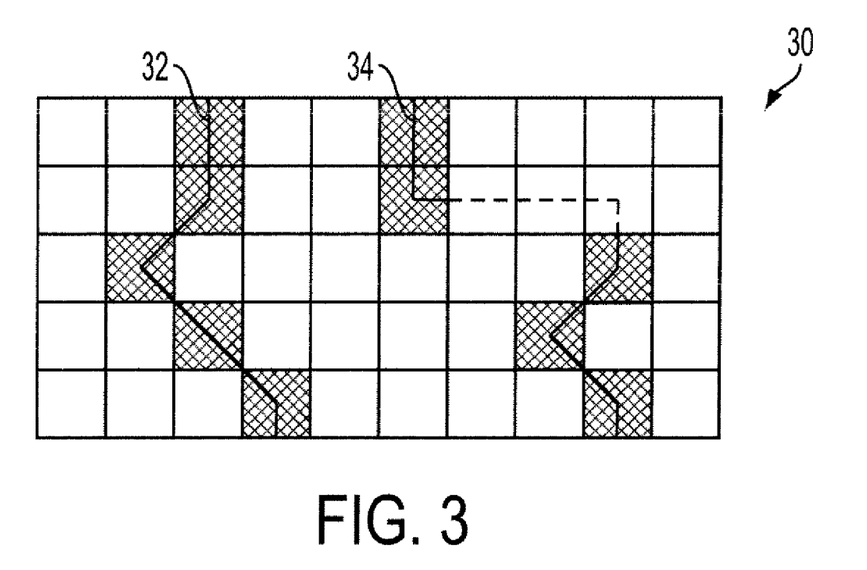
FIG. 3 is a representation of the pixels of a small image.

Because the embodiments described herein operate on images by a process of removing or adding seams to an image, a brief description of seams is provided. With reference to FIG. 3, a representation of the pixels of a small image is shown. The exemplary image is made up of 50 pixels arranged in 5 rows and 10 columns, i.e., a vertical dimension of 5 pixels and a horizontal dimension of 10 pixels. A seam utilizing 8-pixel connectivity (also referred to herein as simply 8-connectivity or 8-connected) such as vertical seam 32 is an optimal connected path that traverses the image from top to bottom, as shown. A seam is considered optimal if the pixels in the seam are located in regions with little activity, as measured, e.g., by a given energy metric. Utilizing 8-connectivity for development of a seam traversing the image from top to bottom provides 3 choices for continuing the seam from a given pixel. For each of the 8 neighboring pixels of the given pixel, only 3 pixels facilitate continuation of a downward direction. Thus, the vertical seam can continue downward in either a diagonal or vertical direction.

For a more formal definition of an 8-connected vertical seam, let I be an image of m columns and n rows of pixels, then an 8-connected vertical seam is:

$$s^x = \{s_i^x\}_{i=1}^n = \{x(i), i\}_{i=1}^n, s.t. \forall i > 1, |x(i) - x(i-1)| \leq 1, \quad (1)$$

where x is a mapping x: $[1, \ldots, n] \to [1, \ldots, m]$, and the notation $\{x,y\}$ refers to a pixel in column x and row y. That is, an 8-connected vertical seam is an 8-connected path of pixels in the image from top to bottom, containing one, and only one, pixel in each row of the image. Similarly, if y is a mapping y: $[1, \ldots, m] \to [1, \ldots, n]$, then a horizontal seam is:

$$s^y = \{s_j^y\}_{j=1}^m = \{j, y(j)\}_{j=1}^m, s.t. \forall j > 1, |y(j) - y(j-1)| \leq 1 \quad (2)$$

The pixels of the path of seam s (e.g., vertical seam $\{s_i\}$) will therefore be $I_s = \{I(s_i)\}_{i=1}^n = \{I(x(i), i)\}_{i=1}^n$.

It has been found beneficial, however, to utilize an extended 8-pixel connectivity (also referred to herein as simply extended 8-connectivity or extended 8-connected) in the embodiments described herein. A seam utilizing extended 8-connectivity such as vertical seam 34 is an optimal connected path similar to the 8-connectivity path described above, however, the definition of connectivity of a seam is extended to include pixels that are along rows (for horizontal resizing) or columns (for vertical resizing) with constant or near-constant values, regardless of the distance between them. Thus, utilizing extended 8-connectivity for development of a seam traversing the image from top to bottom provides 5 choices for continuing the seam from a given pixel. The vertical seam can therefore continue either downward or horizontally. Although the vertical seam is here described as possibly continuing horizontally, it is to be understood that pixels forming a horizontal traversal portion of a vertical seam are technically not part of the vertical seam because they are not deleted or replicated when the vertical seam is deleted from or replicated in the image, as explained in more detail below. Similar comments apply to horizontal seams. Therefore, although reference is made to connectivity, it is to be further understood that an extended 8-connectivity seam as utilized in concepts of the present application may have discontinuities. With reference again to FIG. 1, an exemplary 8-connectivity seam 36 and an exemplary extended 8-connectivity seam 38 are shown. It can be observed that the exemplary 8-connectivity seam 36 always traverses the image in a downward direction, either vertically or diagonally, while the extended 8-connectivity seam 38 sometimes traverses the image in a horizontal direction in white space areas of the image.

One suitable exemplary definition of an extended 8-connected seam is provided. Again, let I be an image of m columns and n rows of pixels, then an extended 8-connected vertical seam may be described by:

$$s^x = \{s_i^x\}_{i=1}^n \\ = \{x(i), i\}_{i=1}^n, \\ s.t. \begin{cases} \forall i > 1, |x(i) - x(i-1)| \leq k \text{ if } \exists k > 1 \\ s.t. \left| \begin{array}{c} f(x(i-1), i-1) - \\ f(x(i-1)+j, i-1) \end{array} \right| \leq \varepsilon, \forall j \text{ s.t. } 0 \leq j \leq k \text{ or } -k \leq j \leq 0, \\ \text{else, } \forall i > 1, |x(i) - x(i-1)| \leq 1 \end{cases} \quad (3)$$

where f is a pixel function for the specified image pixel such as, e.g., intensity, energy, etc. Equation (3) represents the horizontal traversal as traversal from a pixel in column x(i−1) to a possibly disconnected pixel in column x(i), possibly separated by a gap of length k−1. The pixels in the gap are not considered part of the seam, however, and do not add to the cumulative energy of the seam, because the gap pixels are not removed when a seam is removed, nor are they replicated when a seam is replicated. It is to be appreciated that the pixel function may be multi-valued such as, e.g., RGB values for a color image. The present application is not limited in this respect. The parameter £ defines a range, i.e., the maximum range of values permitted along the horizontal (or vertical) extended portion of the seam. It is also to be appreciated that the extended 8-connectivity Equation (3) shown is exemplary only, and any equation which facilitates extending the seam along rows or columns falls within the scope of the present application. Further, although the extended 8-connectivity vertical seam can traverse a row horizontally, when a vertical seam is being removed from (or added to) an image, that only one pixel satisfying Equation (3) in each row of the image is removed (or added). Still further, although the equations shown do not limit the length of the horizontal traversal of the extended seam, it is to be understood that embodiments described herein may limit the length. Similar to the above, if y is a mapping y: $[1, \ldots, m] \rightarrow [1, \ldots, n]$, then an extended 8-connected horizontal seam may be described by:

$$s^y = \{s_j^y\}_{j=1}^m \qquad (4)$$
$$= \{j, y(j)\}_{j=1}^m,$$
$$\text{s.t.} \begin{cases} \text{s.t.} \left| \begin{matrix} f(y(j-1), j-1) - \\ f(y(j-1)+i, j-1) \end{matrix} \right| \le \varepsilon, \forall\ i\ \text{s.t.}\ 0 \le i \le k\ \text{or}\ -k \le i \le 0, \\ \text{else},\ \forall\ j > 1, |y(j) - y(j-1)| \le 1 \end{cases}$$

Figure 4:
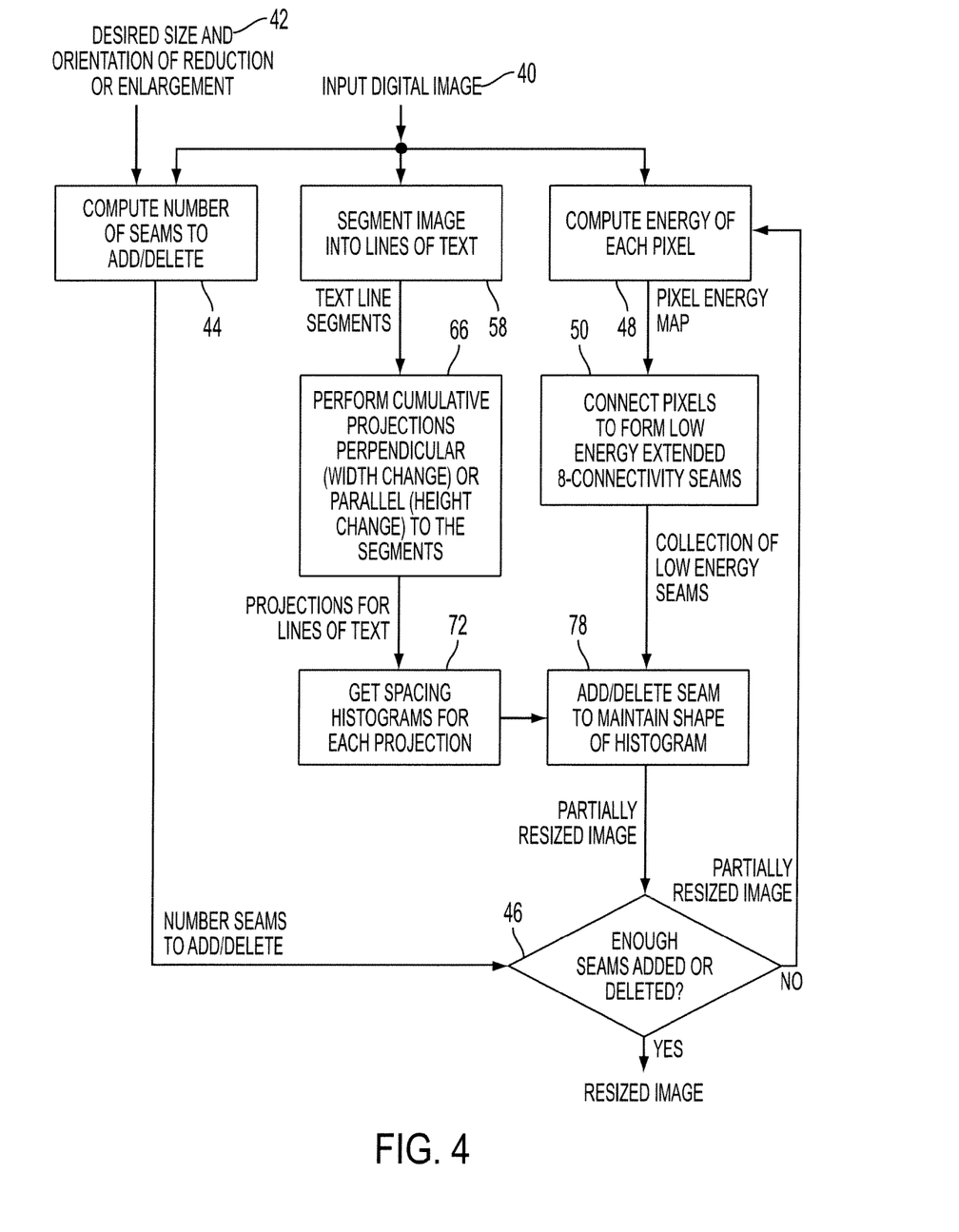
FIG. 4 is a flowchart of a method for content-aware image resizing according to concepts of the present application.

With reference now to FIG. 4, a method for content-aware image resizing according to concepts of the present application is described. Given an input digital image 40 and a desired reduction or enlargement 42, including orientation of the reduction or enlargement, the number of seams to be deleted/added is computed at step 44. Assuming a non-zero number of seams to delete/add, as determined at step 46, seam deletion/addition processing ensues. At step 48, an energy metric is computed for each pixel of the image in order to produce an energy map of the image. One suitable energy metric is the gradient. The energy of a pixel can be defined by local variation in the image or proximity of edges. The energy metric can be determined through operators such as, e.g., the digital gradient, but note that other edge magnitude and variation detection operators can be used in alternative embodiments. In the embodiments described herein, the energy of each pixel is computed from the magnitude of the local image gradient: the larger the local gradient, the larger the energy at that particular pixel.

Figure 5:
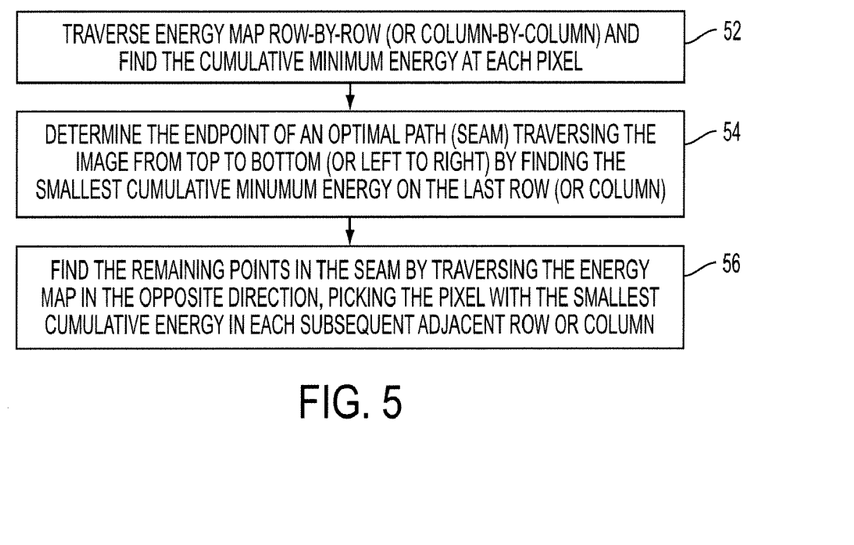
FIG. 5 is a flowchart of a method of selecting pixels utilized by the method shown in FIG. 4.

At step 50, pixels are selected to form cumulative-low-energy seams (vertical or horizontal) that possess extended 8-connectivity as previously described. With reference to FIG. 5, and continuing reference to FIG. 4, the method of selecting pixels at step 50 is described in more detail. The energy map is traversed row-by-row (or column-by-column) at step 52 to find the cumulative minimum energy at each pixel. The smallest cumulative minimum energy value on the last row (or column) is found at step 54, and this value indicates the end point of an optimal path that traverses the image from top to bottom (or from left to right). The remaining pixels belonging to the seam are found by traversing the energy map in the opposite direction at step 56, and selecting the connected pixel with the smallest cumulative energy in each subsequent adjacent row (or column).

The seam connectivity criterion utilized at step 50 when connecting pixels significantly impacts the quality of the resulting image after seam removal depending on the image type. Removal of vertical (or horizontal) collections of pixels with too loose a connectivity requirement can lead to the appearance of shearing and discontinuities. On the other hand, the 8-connectivity described by Avidan and Shamir imposes unnecessary constraints that can lead to a distorted appearance in a portion of an image (see, e.g., 22-28 of FIG. 2). In embodiments described herein, however, the definition of connectivity of a seam has been extended to include pixels that are along rows (for horizontal resizing) or columns (for vertical resizing) with constant or near-constant values or energy, regardless of the distance between them. In some embodiments, it may be desirable to place limits on the length of the seam traversal along the above-mentioned rows or columns in order to ensure a specified degree of smoothness of the seam. This can be accomplished, e.g., by imposing a limit on k in Equations (3) and (4) above. This extended definition of seam connectivity is useful for remedying the problems exhibited in FIG. 2 as described below.

Figure 6:
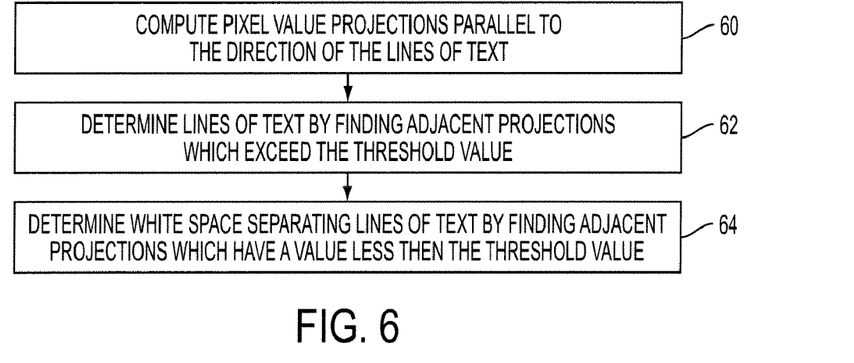
FIG. 6 is a flowchart of a method of segmenting an image into lines of text utilized by the method shown in FIG. 4.
Figure 7:
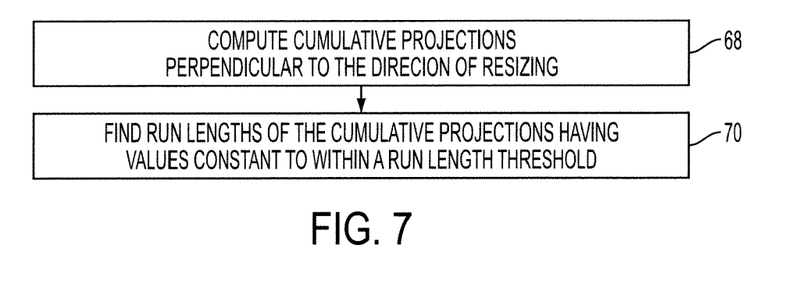
FIG. 7 is a flowchart of a method of computing cumulative projections perpendicular to segments utilized by the method shown in FIG. 4.

With reference again to FIG. 4, at step 58, the input image is divided into lines of text. Alternately, for images that do not contain text, or where the text is not identifiable, the image can be divided into lines of contone images. For example, lines of text or contone images can be identified by determining projections of pixel values in a desired direction to identify white space between lines, or non-white space having text or images in the projection. However, the present application is not limited in this respect, and any known means for dividing the image into lines of text falls within the scope of the present application. By dividing the image into lines of text, seams can be determined with a goal toward maintaining or preserving the appearance of each line when seams are removed. The method of segmenting an image into lines of text at step 50 is described in more detail with reference now to FIG. 6. Pixel value (e.g., intensity) projections are computed parallel to the direction of the lines of text at step 60. Then, at step 62, lines of text are determined by finding adjacent projections that exceed a threshold value. Similarly, at step 64, the white space separating lines of text is determined by finding adjacent projections which have a value less than the threshold value. Returning to FIG. 4, at step 66, cumulative projections are taken. As shown in FIG. 7, the cumulative projections are taken perpendicular to the direction of resizing in step 68. In other words, the projections are taken across the lines in a vertical direction for horizontal resizing or in the direction of the lines in a horizontal direction for vertical resizing. In step 70, run lengths of constant values, or nearly constant to within a threshold, are determined (e.g., spaces between words, spaces between letters, and spaces between lines of text). By way of explanation, the these run lengths are analogous to the illuminated regions that would occur between letters or words if the text were illuminated from above. It is the proportionality of these run-lengths that the embodiments described herein maintain in the subsequent seam removal. It is of interest to note that a contone image within a block of text can be recognized as one line of text and the algorithm will continue to operate normally.

Figure 8:
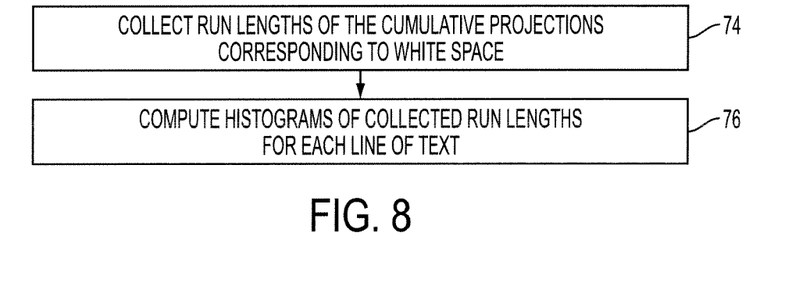
FIG. 8 is a flowchart of a method for generating spacing histograms utilized by the method shown in FIG. 4.

Returning again to FIG. 4, in step 72, histograms of text spacing are generated from the cumulative projections. As further described in FIG. 8, run lengths of saturated or near-saturated values (e.g., near white) are collected in step 74, and a histogram is computed for each line of text in step 76. In other words, each histogram describes the number of run lengths occurring within run length bins for a line of text. Maintaining the proportionality of the bins in subsequent steps will maintain the appearance of the text.

Figure 9:
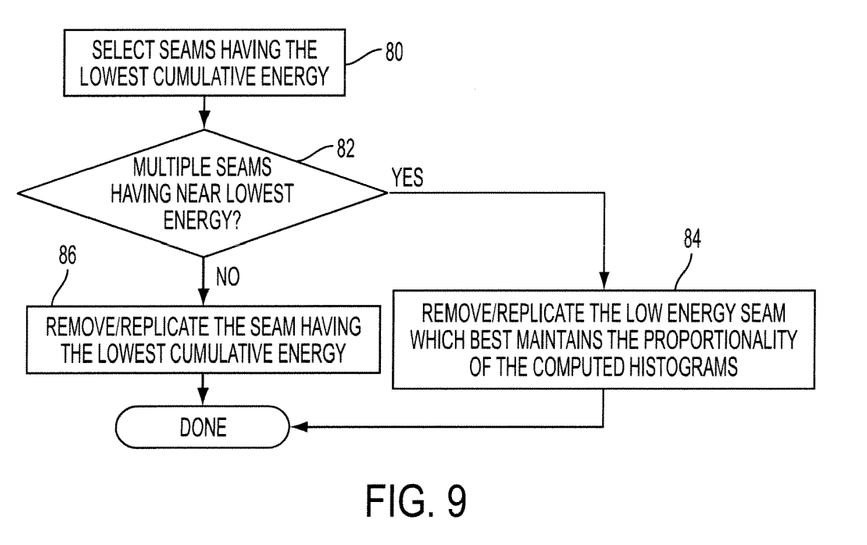
FIG. 9 is a flowchart of a method of adding or removing seams to maintain spacing histogram shapes utilized by the method shown in FIG. 4.

Finally, with reference again to FIG. 4, seams are added or deleted in step 78 with a goal of maintaining histograms similar to the previously generated spacing histograms. This has the beneficial effect of maintaining text spacing relationships similar to those of the original image. As shown in more detail in FIG. 9, cumulative low energy seams are removed to reduce the input image size, or replicated to enlarge the image size. Seams are selected at step 80 having the lowest cumulative energy. When low energy seams have similar cumulative energy (determined at step 82), those seams that best maintain the original text spacing histogram of each line of text are removed (step 84). Otherwise, the seam having the lowest cumulative energy is removed (step 86). In text images and synthetic images, many seams will have identical or nearly identical cumulative energy. In those cases, a requirement is made that the proportionality of the histogram bins be maintained. If the proportionality is not maintained and the above-described looser connectivity requirement (extended 8-connectivity) is not used, seam extraction or replication could get trapped in a smooth part of an image resulting in a distorted appearance where words may get joined or spread too far apart. This defect occurs when applying the Avidan and Shamir method in such cases, as shown previously with reference to FIGS. 1 and 2.

Again, it is to be understood that, where projections of pixel values are discussed as an exemplary method of identifying lines of text and the white space between characters, the intensity of the pixels is a suitable metric. However, other metrics are more suitable when it comes to determining seams. For example, embodiments described herein use a gradient metric as previously described. However, other energy metrics are envisioned and fall within the scope of the present application.

The process of FIG. 4 is iterated, as determined at step 46, as needed. Seams are removed (or added) until the desired image size is achieved. In some embodiments, the energy metrics (steps 48-50) are re-computed after a specified number of seams have been processed. This can be advantageous image-quality wise if many seams are removed or added.

Figure 10:
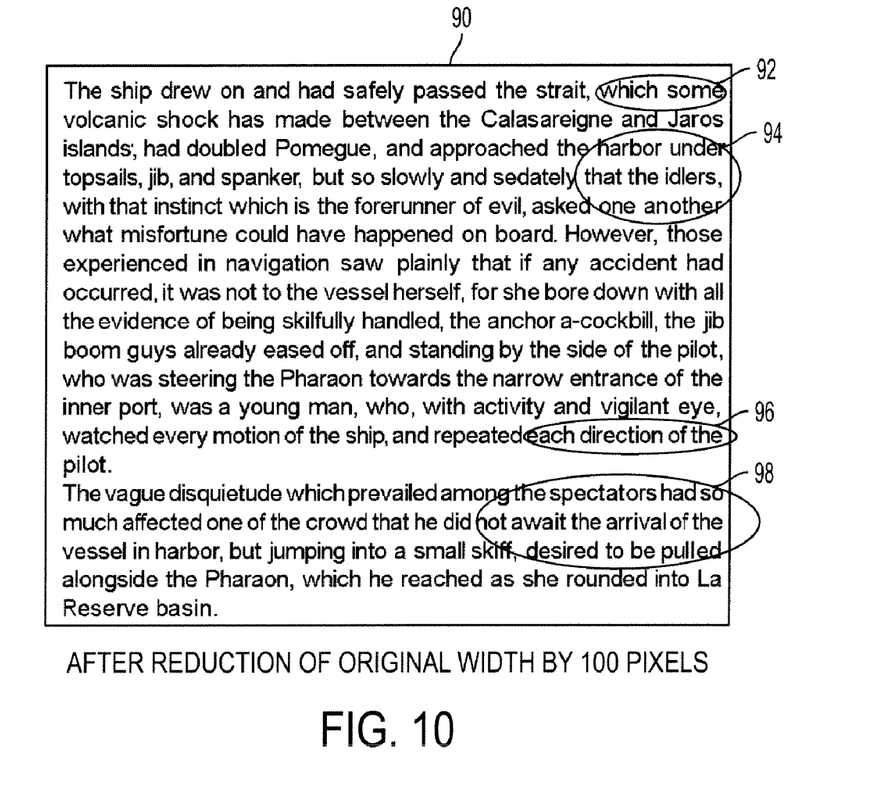
FIG. 10 is an exemplary reduction image resulting from application of concepts of the present application to the image of FIG. 1.

An exemplary reduction by an embodiment of the present application is now provided of the image 10 in FIG. 1 by 100 pixels (10%) in the horizontal dimension. Text areas of particular interest of image 10, as before, are identified by circled areas 12-18. With reference now to FIG. 10, and continuing reference to FIG. 1, the exemplary reduction image 20 is shown, resulting from application of concepts of the present application to image 10 to reduce its width by 100 pixels. Text areas corresponding to the circled areas of FIG. 1 are identified by circled areas 92-98. Notice that the word spacing within the corresponding lines remains similar to the word spacing in the original image 10. Unlike the prior art example shown previously in FIG. 2 where the word spacing is no longer uniform, making the writing difficult to interpret, the writing in the exemplary reduction image 20 can be read without difficulty, and the image has not been distorted in appearance.

Figure 11:
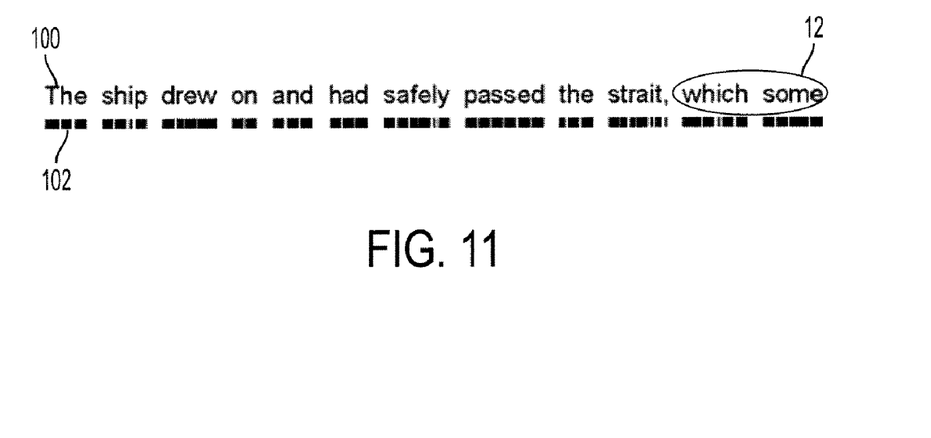
FIG. 11 is an original line of text from the input image of FIG. 1.
Figure 12:
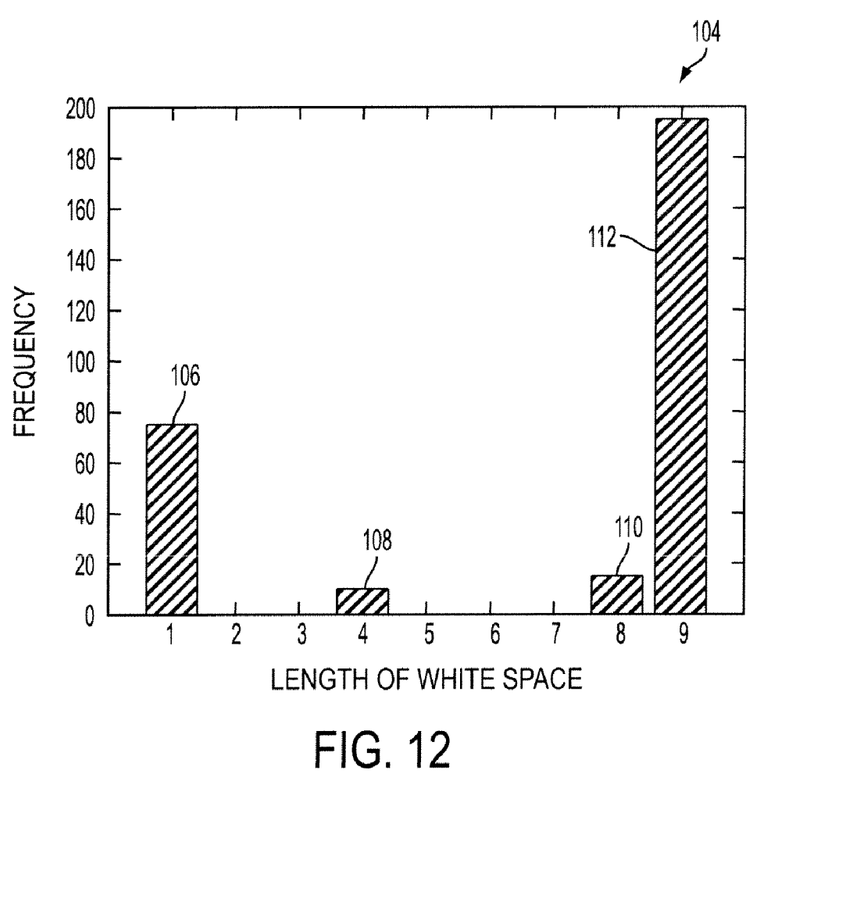
FIG. 12 is a white-space-length histogram of a projection from the image of FIG. 1.

With reference now to FIGS. 11-14, and continuing reference to FIG. 1, exemplary white space projections and histograms are provided. FIG. 11 shows an original line of text 100 from image 10 which contains the circled area 12 containing the words "which some." Shown directly beneath the original line of text 100 is a visual representation of a vertical projection 102 of the text as used in the case of a width reduction. Shown in FIG. 12, is a white-space-length histogram of the original projection 102 including bins 106-112 corresponding to the various white space lengths in the original line of text 100.

Figure 13:
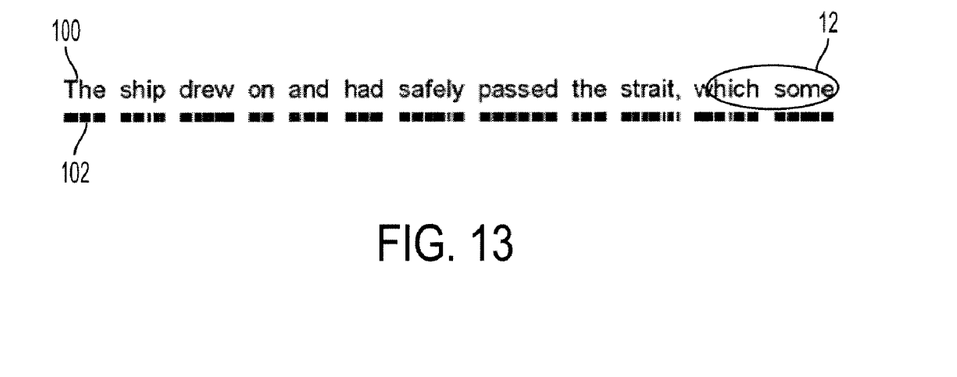
FIG. 13 is a reduced-width line of text from the reduced image shown in FIG. 10.
Figure 14:
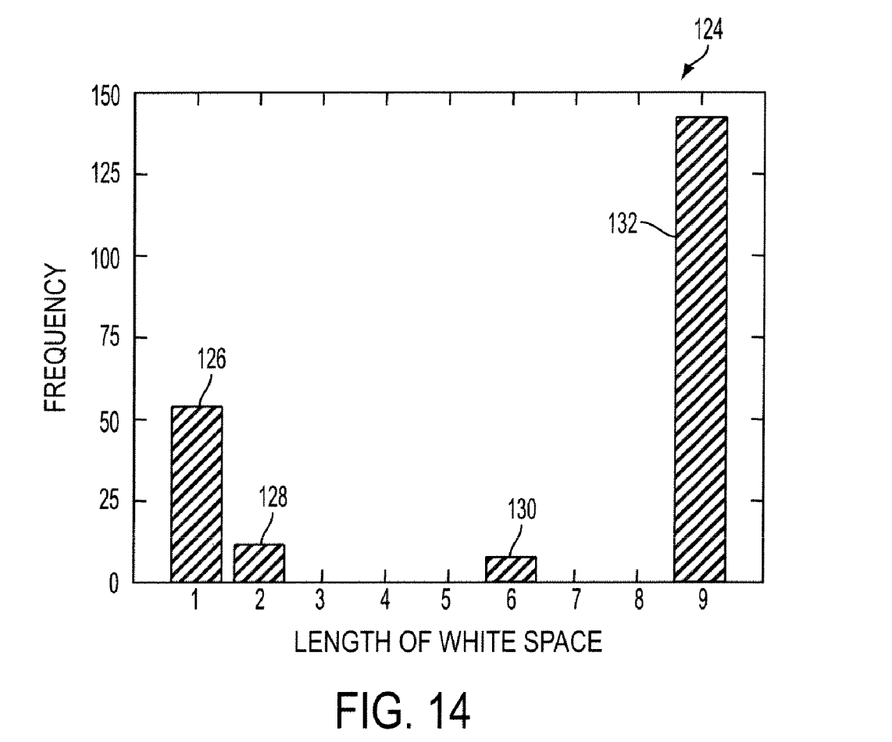
FIG. 14 is a white-space-length histogram of a reduced-width projection corresponding to the various white space lengths in the reduced-width line of text shown in FIG. 13.

FIG. 13 shows a reduced-width line of text 120 from the reduced image 90 as shown in FIG. 10, which contains the circled area 92 corresponding to the circled area 12. Shown directly beneath the reduced-width line of text 120 is a visual representation of a vertical projection 122 of the reduced-width text. Shown in FIG. 14, is a white-space-length histogram of the reduced-width projection 122 including bins 126-132 corresponding to the various white space lengths in the reduced-width line of text 120. One can readily appreciate that the reduced-width histogram 124, although not identical to the original histogram 104, maintains a similarity to the original histogram 104. One can further appreciate that, as a result of maintaining this white-space-length histogram similarity, the text and word spacing of the reduced-width line of text 120 remains readable without difficulty, and maintains a visual appearance similar to that of the original line of text 100.

It is to be appreciated that while the algorithm described herein has been designed with synthetic and text-based images in mind, the connectivity and seam selection criteria are intended to be general enough that the algorithm can also be applied to natural imagery with results similar to those obtained with the Avidan and Shamir algorithm.

Further, it is to be appreciated that embodiments described herein can operate on a portion or portions of an image. For example, a two-column document may be organized with text in the first column and images in the second column, or vice versa. In such an instance, prior to operation of the method described with reference to FIG. 4, or concurrently with determination of the desired size and orientation in step 42, it may be desirable to partition the inputted image into two or more regions, and to then apply the image-resizing method described herein to selected regions of the image. It is to be appreciated that two or more overlapping regions of the partitioned image can also be combined and operated on as a single combined region. The partitioning of the image can be performed either manually or automatically, or by a combination of manual and automatic methods. Any known or envisioned text and/or image recognition procedure can be used to automatically partition the image into text and image regions. For example, various text recognition procedures are known in the art of Optical Character Recognition (OCR), which are suitable for incorporation into embodiments of the present application.

Figure 15:
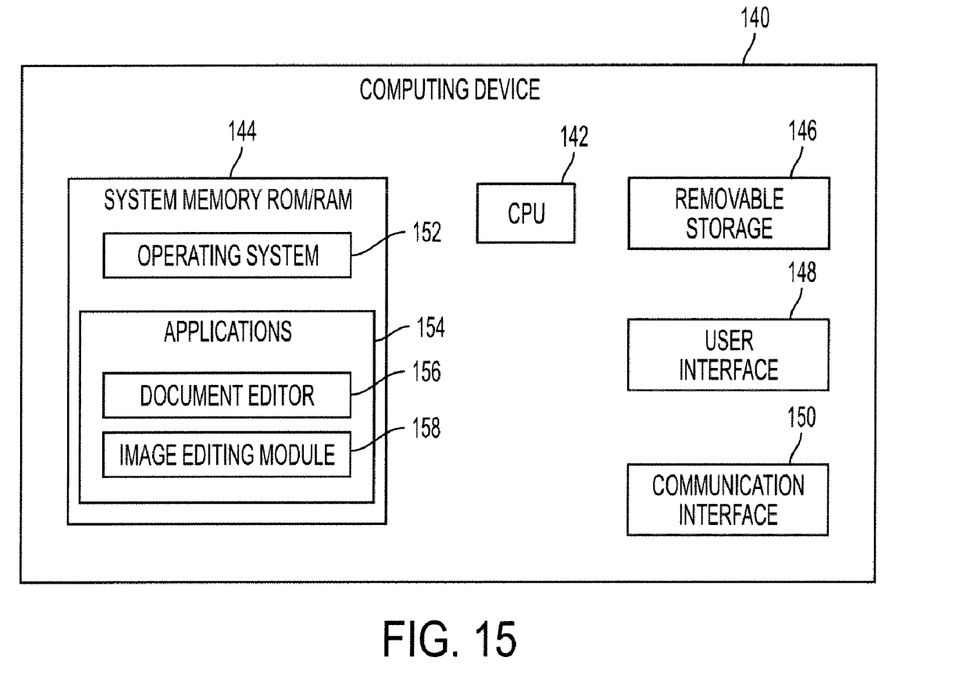
FIG. 15 is an exemplary computing device suitable for incorporating concepts of the present application.

With reference now to FIG. 15, an exemplary computing device 140 suitable for incorporating concepts of the present application is shown. The computing device 140 includes typical components of a computing device. For example, the computing device 140 may include a processor 142 and system memory 144. The processor may be, e.g., a central processing unit (CPU), a micro-controller unit (MCU), digital signal processor (DSP), or the like. The system memory may include, e.g., read only memory (ROM), random access memory (RAM), and/or memory with other access options. The computing device 140 may also include storage 146 such as computer readable media, including, e.g., magnetic media, such as a hard disk, a floppy disk, or other magnetic disk, a tape, a cassette tape, optical media, such as optical disk (CD-ROM, DVD), semiconductor media, such as DRAM, SRAM, EPROM, EEPROM, or memory stick. Further, portions of storage may be removable or non-removable.

The computing device 140 may also include: a user interface 148 comprising, e.g., a display screen such as a liquid crystal display, plasma display, or cathode ray tube display;

and an input/output device such as a keyboard, pointing device, microphone, and speakers. The computing device 140 may also include one or more communication interfaces 150 for communicating with, e.g., peripheral devices such as input/output devices, including scanners and printers, or for communicating with other computing systems via a wired or wireless network.

The system memory 144 may store and support modules, for example, an operating system (OS) 152 and program applications 154. The program applications 154 may include a document editor 156 for editing and manipulating documents having text and/or images, such as, e.g., a word-processor, desktop publishing application, html editor, web page publishing application, etc. Also stored and supported in the system memory, either permanently or temporarily, may be an image editing module 158. The image editing module 158 is configured to perform concepts of the present application for content-aware image resizing as previously described herein. The document editor 156 or other program applications may utilize the image editing module 158 for image resizing or may, alternately, incorporate concepts of the present application directly. Further, the program applications and the image editing module 158 described with reference to the storage 146 may be stored on and accessed from the computer readable media. The program applications and the image editing module 158 may also be accessed or retrieved from other computing systems and/or storage systems via the communication interface 150.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for resizing images, the method comprising:
    receiving a digital image comprising a rectangular array of rows and columns of pixels, wherein the received digital image is to be resized in a direction of resizing comprising one of a horizontal direction and a vertical direction;
    computing an energy value for each of the pixels;
    selecting pixels to form a plurality of extended 8-connectivity seams, wherein each seam has a cumulative energy comprising a sum of the energy values of the selected pixels forming the seam;
    segmenting the received digital image into a plurality of segments, each segment corresponding to a line of at least one of text and images;
    generating a resized image from the received digital image, comprising:
        selecting a selected seam of the plurality of extended 8-connectivity seams, the selected seam selected based on best maintaining a proportionality of white space in the plurality of segments when replicated or deleted;
        replicating the selected seam if the received digital image is being enlarged in size; and
        deleting the selected seam if the received digital image is being reduced in size;
    repeating at least the generating a resized image until the resized image is a desired size; and
    outputting the resized image to at least one of a display screen, a storage device, and a printer for producing a printed image.

2. The method of claim 1, further comprising:
    generating a plurality of cumulative projections, each cumulative projection corresponding to one of the plurality of segments;
    generating a plurality of spacing histograms, each spacing histogram corresponding to one of the plurality of cumulative projections; and
    wherein the selecting a selected seam of the plurality of extended 8-connectivity seams comprises: determining the selected seam based on which of the formed 8-connectivity seams most closely maintains the shapes of the generated spacing histograms when replicated or deleted.

3. The method of claim 2, wherein the energy value for each of the pixels comprises a magnitude of the local image gradient at the respective pixel location.

4. The method of claim 2, wherein:
    each of the extended 8-connectivity seams comprises seam pixels traversing the image from top to bottom if the direction of resizing is a horizontal direction, and wherein, for each current seam pixel, the seam progresses to an adjacent pixel selected from: a pixel to the left of the current seam pixel, a pixel to the right of the current seam pixel, a pixel diagonally below and to the left of the current seam pixel, a pixel diagonally below and to the right of the current seam pixel, and a pixel directly below the current seam pixel; and
    each of the extended 8-connectivity seams comprises seam pixels traversing the image from left to right if the direction of resizing is a vertical direction, and wherein, for each current seam pixel, the seam progresses to an adjacent pixel selected from: a pixel directly below the current seam pixel, a pixel directly above the current seam pixel, a pixel diagonally below and to the right of the current seam pixel, a pixel diagonally above and to the right of the current seam pixel, and a pixel directly to the right of the current seam pixel.

5. The method of claim 2, wherein the segmenting the received digital image into a plurality of segments comprises:
    computing pixel value projections parallel to the direction of the lines of text;
    determining each of the lines of text by finding adjacent pixel value projections having a projection value which exceeds a projection threshold value; and
    determining white space separating the lines of the text by finding adjacent pixel value projections having a projection value less than the projection threshold value.

6. The method of claim 2, wherein the generating a plurality of cumulative projections comprises:
    computing cumulative projections perpendicular to the direction of resizing; and
    finding run lengths of the cumulative projections having cumulative projection values constant to within a run length threshold value.

7. The method of claim 6, wherein the generating a plurality of spacing histograms comprises:
    collecting run lengths of the cumulative projections corresponding to white space in the received digital image; and
    computing each of the plurality of spacing histograms based on the collected run lengths of the cumulative projections.

8. The method of claim 2, wherein the selecting pixels to form a plurality of extended 8-connectivity seams comprises:
    first traversing the computed energy values of the pixels row-by-row if the digital image is being resized in a horizontal direction or column-by-column if the digital image is being resized in a vertical direction to find the cumulative minimum energy for each pixel;

determining an endpoint of a seam by finding the smallest cumulative minimum energy on a last row or column of the digital image; and finding remaining pixels in the seam by traversing the computed energy values of the pixels in the opposite direction to the first traversing, selecting the pixel with the smallest cumulative energy in each subsequent adjacent row or column of the digital image.

9. The method of claim 2, wherein:

the determining a selected seam comprises:

select at least one candidate seam from the plurality of extended 8-connectivity seams, the at least one candidate seam having the lowest cumulative computed energy values of the extended 8-connectivity seams in the resized image; and if the at least one candidate seam includes multiple seams, select from the candidate seams the seam which best maintains a proportionality of the computed histograms when replicated or deleted as the selected seam, otherwise, select the at least one candidate seam as the selected seam.

10. The method of claim 1, the method further comprising:

partitioning the received digital image into a plurality of regions, wherein the steps of selecting pixels, segmenting the received digital image, and generating a resized image are performed on selected regions of the plurality of regions.

11. A non-transitory computer readable medium storing a program causing a computer to execute a process for resizing images, the process comprising:

receiving a digital image comprising a rectangular array of rows and columns of pixels, wherein the received digital image is to be resized in a direction of resizing comprising one of a horizontal direction and a vertical direction;

computing an energy value for each of the pixels;

selecting pixels to form a plurality of extended 8-connectivity seams, wherein each seam has a cumulative energy comprising a sum of the energy values of the selected pixels forming the seam;

segmenting the received digital image into a plurality of segments, each segment corresponding to a line of at least one of text and images;

generating a resized image from the received digital image, comprising:

selecting a selected seam of the plurality of extended 8-connectivity seams, the selected seam selected based on best maintaining a proportionality of white space in the plurality of segments when replicated or deleted;

replicating the selected seam if the received digital image is being enlarged in size; and deleting the selected seam if the received digital image is being reduced in size;

repeating at least the generating a resized image until the resized image is a desired size; and outputting the resized image to at least one of a display screen, a storage device, and a printer for producing a printed image.

12. The computer readable medium of claim 11, the process further comprising:

generating a plurality of cumulative projections, each cumulative projection corresponding to one of the plurality of segments;

generating a plurality of spacing histograms, each spacing histogram corresponding to one of the plurality of cumulative projections; and wherein the selecting a selected seam of the plurality of extended 8-connectivity seams comprises: determining the selected seam based on which of the formed 8-connectivity seams most closely maintains the shapes of the generated spacing histograms when replicated or deleted.

13. The computer readable medium of claim 12, wherein the energy value for each of the pixels comprises a magnitude of the local image gradient at the respective pixel location.

14. The computer readable medium of claim 12, wherein:

each of the extended 8-connectivity seams comprises seam pixels traversing the image from top to bottom if the direction of resizing is a horizontal direction, and wherein, for each current seam pixel, the seam progresses to an adjacent pixel selected from: a pixel to the left of the current seam pixel, a pixel to the right of the current seam pixel, a pixel diagonally below and to the left of the current seam pixel, a pixel diagonally below and to the right of the current seam pixel, and a pixel directly below the current seam pixel; and each of the extended 8-connectivity seams comprises seam pixels traversing the image from left to right if the direction of resizing is a vertical direction, and wherein, for each current seam pixel, the seam progresses to an adjacent pixel selected from: a pixel directly below the current seam pixel, a pixel directly above the current seam pixel, a pixel diagonally below and to the right of the current seam pixel, a pixel diagonally above and to the right of the current seam pixel, and a pixel directly to the right of the current seam pixel.

15. The computer readable medium of claim 12, wherein the segmenting the received digital image into a plurality of segments comprises:

computing pixel value projections parallel to the direction of the lines of text;

determining each of the lines of text by finding adjacent pixel value projections having a projection value which exceeds a projection threshold value; and determining white space separating the lines of the text by finding adjacent pixel value projections having a projection value less than the projection threshold value.

16. The computer readable medium of claim 12, wherein the generating a plurality of cumulative projections comprises:

computing cumulative projections perpendicular to the direction of resizing; and finding run lengths of the cumulative projections having cumulative projection values constant to within a run length threshold value.

17. The computer readable medium of claim 16, wherein the generating a plurality of spacing histograms comprises:

collecting run lengths of the cumulative projections corresponding to white space in the received digital image; and computing each of the plurality of spacing histograms based on the collected run lengths of the cumulative projections.

18. The computer readable medium of claim 12, wherein the selecting pixels to form a plurality of extended 8-connectivity seams comprises:

first traversing the computed energy values of the pixels row-by-row if the digital image is being resized in a horizontal direction or column-by-column if the digital image is being resized in a vertical direction to find the cumulative minimum energy for each pixel;

determining an endpoint of a seam by finding the smallest cumulative minimum energy on a last row or column of the digital image; and finding remaining pixels in the seam by traversing the computed energy values of the pixels in the opposite direction to the first traversing, selecting the pixel with the smallest cumulative energy in each subsequent adjacent row or column of the digital image.

19. The computer readable medium of claim 12, wherein: the determining a selected seam comprises:

- select at least one candidate seam from the plurality of extended 8-connectivity seams, the at least one candidate seam having the lowest cumulative computed energy values of the extended 8-connectivity seams in the resized image; and
- if the at least one candidate seam includes multiple seams, select from the candidate seam the seam which best maintains a proportionality of the computed histograms when replicated or deleted as the selected seam, otherwise, select the at least one candidate seam as the selected seam.

20. The computer readable medium of claim 11, the process further comprising:

partitioning the received digital image into a plurality of regions, wherein the steps of selecting pixels, segmenting the received digital image, and generating a resized image are performed on selected regions of the plurality of regions.

21. A computing device for resizing images, the computing device comprising:

a system memory for storing program applications including an image editing module;

a processor for controlling operation of the stored program applications;

at least one of: storage for accessing the program applications and the image editing module for storage in the system memory; and a communication interface for accessing the program applications and the image editing module for storage in the system memory;

wherein the image editing module, when stored in the memory, is configured to perform an image resizing process, the image resizing process comprising:

receiving a digital image comprising a rectangular array of rows and columns of pixels, wherein the received digital image is to be resized in a direction of resizing comprising one of a horizontal direction and a vertical direction;

computing an energy value for each of the pixels;

selecting pixels to form a plurality of extended 8-connectivity seams, wherein each seam has a cumulative energy comprising a sum of the energy values of the selected pixels forming the seam;

segmenting the received digital image into a plurality of segments, each segment corresponding to a line of at least one of text and images;

generating a resized image from the received digital image, comprising:

- selecting a selected seam of the plurality of extended 8-connectivity seams, the selected seam selected based on best maintaining a proportionality of white space in the plurality of segments when replicated or deleted;
- replicating the selected seam if the received digital image is being enlarged in size; and
- deleting the selected seam if the received digital image is being reduced in size;

repeating at least the generating a resized image until the resized image is a desired size; and outputting the resized image to at least one of a display screen, the storage, and a printer for producing a printed image.

22. The computing device of claim 21, the image resizing process further comprising:

generating a plurality of cumulative projections, each cumulative projection corresponding to one of the plurality of segments;

generating a plurality of spacing histograms, each spacing histogram corresponding to one of the plurality of cumulative projections; and wherein the selecting a selected seam of the plurality of extended 8-connectivity seams comprises: determining the selected seam based on which of the formed 8-connectivity seams most closely maintains the shapes of the generated spacing histograms when replicated or deleted.

23. The computing device of claim 21, the image resizing process further comprising:

partitioning the received digital image into a plurality of regions, wherein the steps of selecting pixels, segmenting the received digital image, and generating a resized image are performed on selected regions of the plurality of regions.

* * * * *